United States Patent [19]
Okajima et al.

[11] Patent Number: 5,475,534
[45] Date of Patent: Dec. 12, 1995

[54] PROJECTION LENS SYSTEMS FOR PROJECTOR

[75] Inventors: Koji Okajima, Kanagawa; Akira Nakamura, Tokyo, both of Japan

[73] Assignee: Sony Corporation, Tokyo, Japan

[21] Appl. No.: 250,424

[22] Filed: May 27, 1994

[30]     Foreign Application Priority Data

May 28, 1993  [JP]  Japan .................................. 5-151495

[51] Int. Cl.$^6$ ........................................... G02B 3/00
[52] U.S. Cl. ........................................ 359/649; 359/708
[58] Field of Search .................................. 359/649, 650, 359/651, 708, 713, 756

[56]         References Cited

U.S. PATENT DOCUMENTS 5,296,967   3/1994   Moskovich .............................. 359/649

*Primary Examiner*—Georgia Y. Epps
*Assistant Examiner*—Dawn-Marie Bey
*Attorney, Agent, or Firm*—William S. Frommer; Alvin Sinderbrand

[57]          ABSTRACT

A projection lens system includes a cathode ray tube which projects the image to be projected on the screen through a set of six projection lens, which include non-spherical surfaces. The projection lens system is obliquely positioned in order to incline the optical axis of the projection lens at a predetermined angle with regard to the optical axis which exits from the projection lens and reaches the screen.

3 Claims, 19 Drawing Sheets

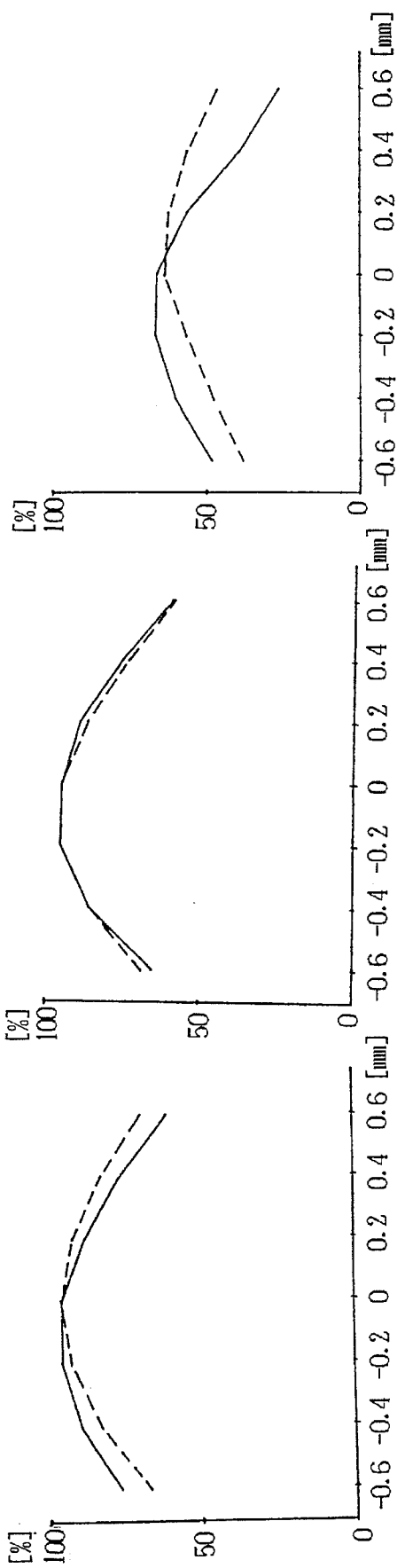
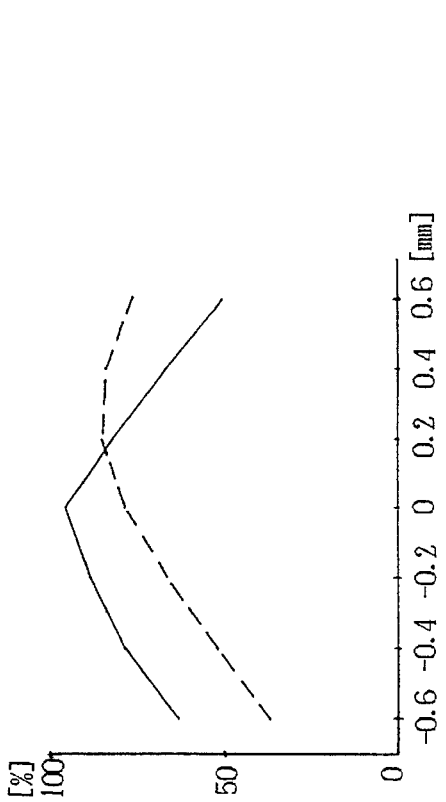
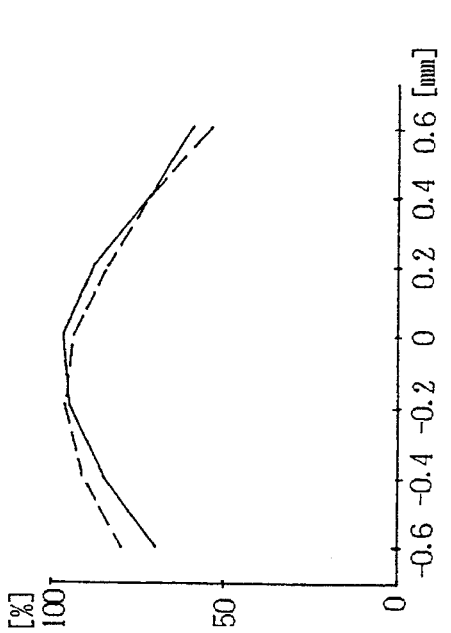
FIG. 3A  FIG. 3B  FIG. 3C  FIG. 3D  FIG. 3E

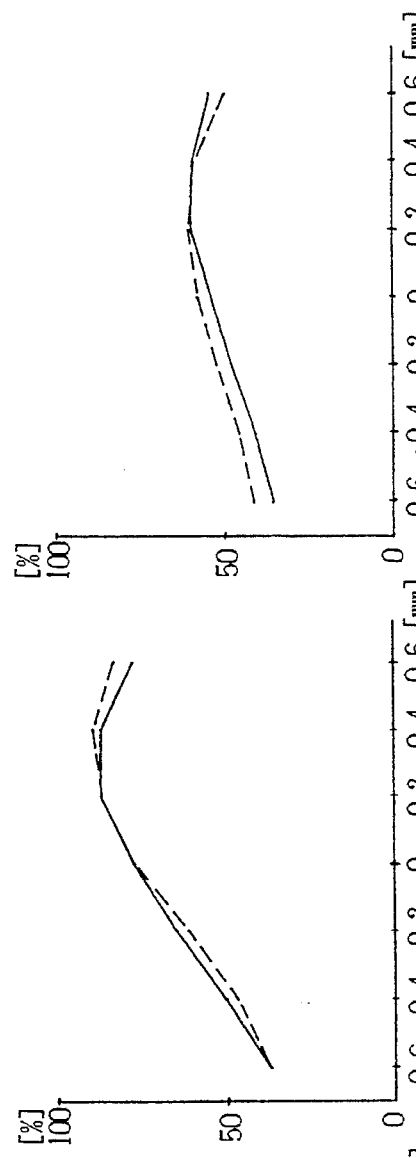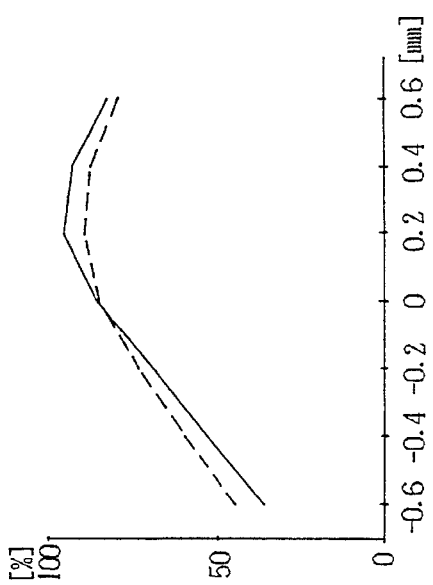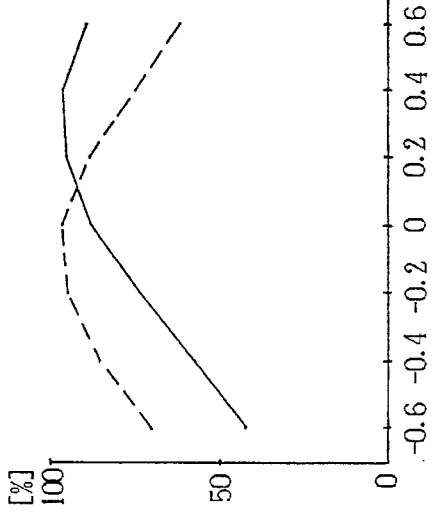

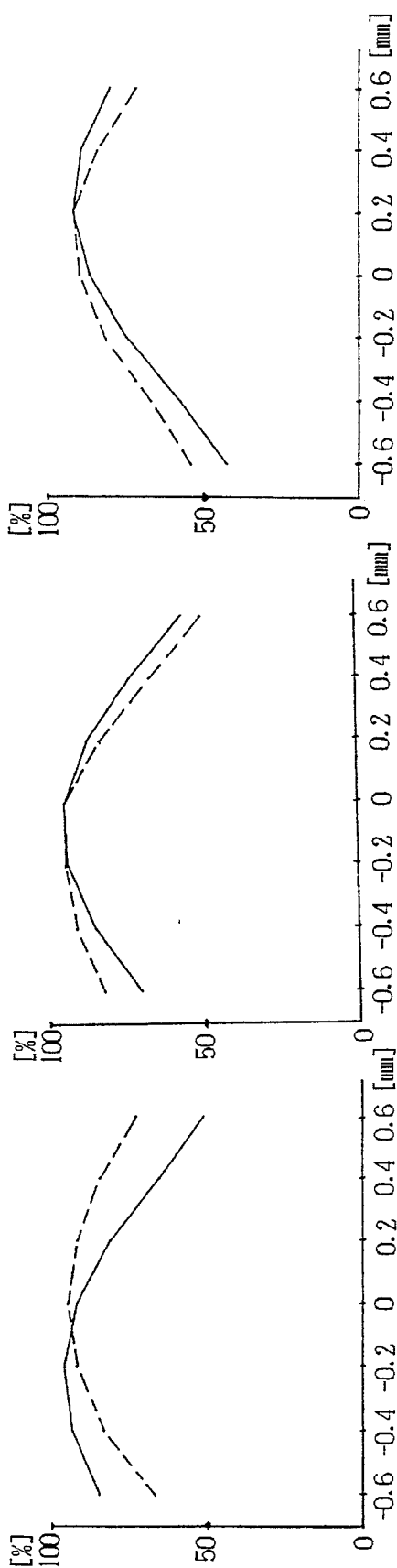
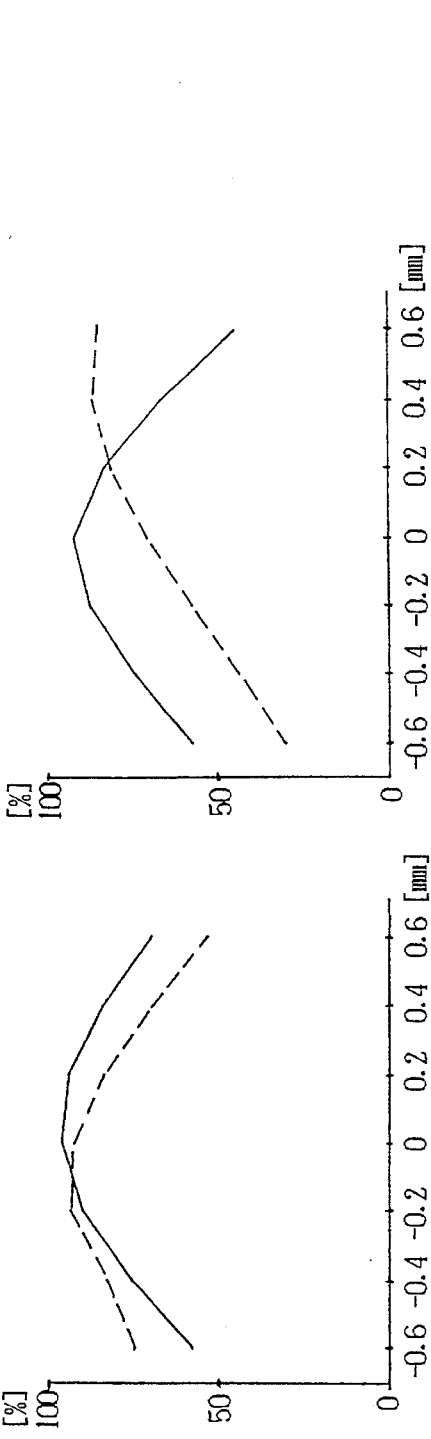

$f = 66.02$, $F_{NO}$ 1.00, $2w = 83.5°$

| i | $r_i$ | $d_i$ | $n_i$ | $v_i$ |
|---|---|---|---|---|
| 0 | ∞ | 642.55 | | |
| 1 | 70.188 | 7.32 | 1.494 | 57.0 |
| 2 | 133.207 | 10.99 | | |
| 3 | -72.530 | 6.89 | 1.494 | 57.0 |
| 4 | -51.849 | 0.99 | | |
| 5 | 76.360 | 20.35 | 1.591 | 61.3 |
| 6 | -101.686 | 1.24 | | |
| 7 | -150.260 | 4.00 | 1.591 | 31.0 |
| 8 | 128.651 | 2.15 | | |
| 9 | 142.204 | 9.14 | 1.494 | 57.0 |
| 10 | -101.345 | 25.91 | | |
| 11 | -44.971 | 4.00 | 1.494 | 57.0 |
| 12 | -45.000 | 10.00 | 1.432 | 50.0 |
| 13 | ∞ | 13.00 | 1.563 | 50.0 |
| 14 | -350.000 | | | |

FIG. 13

|   | $r_1$ | $r_2$ | $r_4$ | $r_7$ |
|---|---|---|---|---|
| K | $-1.2189$ | $-0.1249$ | $0.0$ | $0.0$ |
| $A_4$ | $-0.1693 \times 10^{-5}$ | $-0.3638 \times 10^{-7}$ | $0.2082 \times 10^{-5}$ | $0.5545 \times 10^{-5}$ |
| $A_6$ | $-0.2563 \times 10^{-8}$ | $-0.4229 \times 10^{-8}$ | $-0.1723 \times 10^{-8}$ | $-0.3985 \times 10^{-8}$ |
| $A_8$ | $-0.1058 \times 10^{-11}$ | $0.3132 \times 10^{-11}$ | $0.1559 \times 10^{-11}$ | $0.2675 \times 10^{-11}$ |
| $A_{10}$ | $0.1498 \times 10^{-14}$ | $-0.6341 \times 10^{-15}$ | $-0.5233 \times 10^{-15}$ | $-0.9274 \times 10^{-15}$ |
| $A_{12}$ | $0.3330 \times 10^{-18}$ | $0.3991 \times 10^{-19}$ | | |
| $A_{14}$ | $-0.3265 \times 10^{-21}$ | $0.1530 \times 10^{-21}$ | | |

FIG. 14A

|   | $r_9$ | $r_{10}$ | $r_{11}$ |
|---|---|---|---|
| K | $-7.5088$ | $0.0$ | $0.0$ |
| $A_4$ | $-0.5344 \times 10^{-5}$ | $0.4053 \times 10^{-6}$ | $-0.1062 \times 10^{-4}$ |
| $A_6$ | $0.5024 \times 10^{-8}$ | $-0.1168 \times 10^{-8}$ | $0.1696 \times 10^{-7}$ |
| $A_8$ | $-0.3099 \times 10^{-11}$ | $0.2857 \times 10^{-11}$ | $-0.2453 \times 10^{-10}$ |
| $A_{10}$ | $0.2390 \times 10^{-14}$ | $0.5719 \times 10^{-18}$ | $0.2959 \times 10^{-14}$ |
| $A_{12}$ | | | $0.2136 \times 10^{-16}$ |
| $A_{14}$ | | | $-0.1528 \times 10^{-19}$ |
| $A_{16}$ | | | $0.2264 \times 10^{-24}$ |
| $A_{18}$ | | | $0.3006 \times 10^{-27}$ |
| $A_{20}$ | | | $-0.6553 \times 10^{-31}$ |

FIG. 14B $f = 66.00$, $F_{NO}$ $1.04$, $2w = 83.5°$

| i | $r_i$ | $d_i$ | $n_i$ | $v_i$ |
|---|---|---|---|---|
| 0 | ∞ | 642.50 | | |
| 1 | 75.684 | 7.32 | 1.494 | 57.0 |
| 2 | 112.119 | 11.66 | | |
| 3 | -119.421 | 9.00 | 1.494 | 57.0 |
| 4 | -56.641 | 0.99 | | |
| 5 | 82.686 | 18.83 | 1.591 | 61.3 |
| 6 | -89.930 | 1.24 | | |
| 7 | -75.544 | 4.00 | 1.591 | 31.0 |
| 8 | -4184.741 | 8.99 | | |
| 9 | 93.249 | 10.00 | 1.494 | 57.0 |
| 10 | -188.649 | 19.97 | | |
| 11 | -37.142 | 4.00 | 1.494 | 57.0 |
| 12 | -45.000 | 10.00 | 1.432 | 50.0 |
| 13 | ∞ | 13.00 | 1.563 | 50.0 |
| 14 | -350.000 | | | |

FIG. 17

|     | $r_1$ | $r_2$ | $r_4$ | $r_7$ |
|---|---|---|---|---|
| K | -2.2788 | -0.4288 | 0.0 | 0.0 |
| $A_4$ | $-0.2010 \times 10^{-5}$ | $-0.3763 \times 10^{-8}$ | $0.1441 \times 10^{-5}$ | $0.5520 \times 10^{-5}$ |
| $A_6$ | $-0.2683 \times 10^{-8}$ | $-0.4681 \times 10^{-8}$ | $-0.1341 \times 10^{-8}$ | $-0.3910 \times 10^{-8}$ |
| $A_8$ | $-0.1083 \times 10^{-11}$ | $0.3132 \times 10^{-11}$ | $0.1672 \times 10^{-11}$ | $0.2678 \times 10^{-11}$ |
| $A_{10}$ | $0.1623 \times 10^{-14}$ | $-0.6325 \times 10^{-15}$ | $-0.6461 \times 10^{-15}$ | $-0.1034 \times 10^{-14}$ |
| $A_{12}$ | $0.3330 \times 10^{-18}$ | $0.3991 \times 10^{-19}$ | | |
| $A_{14}$ | $-0.3275 \times 10^{-21}$ | $0.1829 \times 10^{-21}$ | | |

FIG. 18A

|     | $r_9$ | $r_{10}$ | $r_{11}$ |
|---|---|---|---|
| K | -1.8024 | 0.0 | 0.0 |
| $A_4$ | $-0.5967 \times 10^{-5}$ | $-0.2188 \times 10^{-5}$ | $-0.6115 \times 10^{-5}$ |
| $A_6$ | $0.2551 \times 10^{-8}$ | $-0.2451 \times 10^{-8}$ | $0.1030 \times 10^{-7}$ |
| $A_8$ | $-0.4249 \times 10^{-11}$ | $0.1062 \times 10^{-11}$ | $-0.1684 \times 10^{-10}$ |
| $A_{10}$ | $0.2688 \times 10^{-14}$ | $0.7625 \times 10^{-16}$ | $0.3982 \times 10^{-14}$ |
| $A_{12}$ | | | $0.2136 \times 10^{-16}$ |
| $A_{14}$ | | | $-0.1528 \times 10^{-19}$ |
| $A_{16}$ | | | $-0.2661 \times 10^{-23}$ |
| $A_{18}$ | | | $0.9682 \times 10^{-27}$ |
| $A_{20}$ | | | $-0.1629 \times 10^{-29}$ |

FIG. 18B f = 66.00, F_NO 1.00, 2w = 83.5°

| i | $r_i$ | $d_i$ | $n_i$ | $v_i$ |
|---|---|---|---|---|
| 0 | ∞ | 639.76 | | |
| 1 | 71.036 | 7.50 | 1.494 | 57.0 |
| 2 | 172.915 | 8.07 | | |
| 3 | -101.937 | 9.00 | 1.494 | 57.0 |
| 4 | -61.816 | 7.00 | | |
| 5 | 80.258 | 19.53 | 1.591 | 61.3 |
| 6 | -90.777 | 0.99 | | |
| 7 | -103.555 | 4.00 | 1.591 | 31.0 |
| 8 | 147.248 | 2.78 | | |
| 9 | 92.427 | 10.00 | 1.494 | 57.0 |
| 10 | -137.868 | 21.80 | | |
| 11 | -44.554 | 4.00 | 1.494 | 57.0 |
| 12 | -45.000 | 10.00 | 1.432 | 50.0 |
| 13 | ∞ | 13.00 | 1.563 | 50.0 |
| 14 | -350.000 | | | |

FIG. 21

| CONDITIONS | 1ST EMBODIMENT | 2ND EMBODIMENT | 3RD EMBODIMENT |
|---|---|---|---|
| 1ST CONDITION $K_M/K_0$ | 0.857 | 0.867 | 0.878 |
| 2ND CONDITION $D \cdot K_0$ | 0.109 | 0.079 | 0.077 |

FIG. 24

|     | $r_1$ | $r_2$ | $r_4$ | $r_7$ |
|-----|-------|-------|-------|-------|
| K | -0.9227 | 4.9053 | 0.0 | 0.0 |
| $A_4$ | $-0.1627 \times 10^{-5}$ | $0.2554 \times 10^{-6}$ | $0.1229 \times 10^{-5}$ | $0.5585 \times 10^{-5}$ |
| $A_6$ | $-0.2481 \times 10^{-8}$ | $-0.4520 \times 10^{-8}$ | $-0.2108 \times 10^{-8}$ | $-0.4257 \times 10^{-8}$ |
| $A_8$ | $-0.1217 \times 10^{-11}$ | $-0.3445 \times 10^{-11}$ | $0.1717 \times 10^{-11}$ | $0.2896 \times 10^{-11}$ |
| $A_{10}$ | $0.1504 \times 10^{-14}$ | $0.4625 \times 10^{-15}$ | $-0.7425 \times 10^{-15}$ | $-0.1381 \times 10^{-14}$ |
| $A_{12}$ | $0.3330 \times 10^{-18}$ | $0.3991 \times 10^{-19}$ | | |
| $A_{14}$ | $-0.3972 \times 10^{-21}$ | $-0.3076 \times 10^{-22}$ | | |

FIG. 22 A

|     | $r_9$ | $r_{10}$ | $r_{11}$ |
|-----|-------|----------|----------|
| K | -1.2769 | 0.0 | 0.0 |
| $A_4$ | $-0.6290 \times 10^{-5}$ | $-0.1677 \times 10^{-6}$ | $-0.9426 \times 10^{-5}$ |
| $A_6$ | $0.2048 \times 10^{-8}$ | $-0.3897 \times 10^{-8}$ | $0.8078 \times 10^{-8}$ |
| $A_8$ | $-0.3828 \times 10^{-11}$ | $0.1231 \times 10^{-11}$ | $-0.1367 \times 10^{-10}$ |
| $A_{10}$ | $0.4116 \times 10^{-14}$ | $0.1274 \times 10^{-14}$ | $0.9948 \times 10^{-15}$ |
| $A_{12}$ | | | $0.2136 \times 10^{-16}$ |
| $A_{14}$ | | | $-0.1528 \times 10^{-19}$ |
| $A_{16}$ | | | $-0.2735 \times 10^{-23}$ |
| $A_{18}$ | | | $0.2537 \times 10^{-26}$ |
| $A_{20}$ | | | $-0.6911 \times 10^{-31}$ |

FIG. 22 B

PROJECTION LENS SYSTEMS FOR PROJECTOR

BACKGROUND OF THE INVENTION

FIELD OF THE INVENTION

This invention relates to a projection lens system for projector, and more particularly, to a projection lens to be used for a projection television.

DESCRIPTION OF THE RELATED ART

Heretofore, in the three tube projection television, red, green and blue color images projected on a CRT (cathode ray tube) are past through the projection lens which comprises three projection lens systems respectively, and are then refracted at a mirror to display on enlarged image on a screen.

For example, the conventional projection television is disclosed in the U.S. Pat. No. 4,682,862.

At this point, the optical axis of green color projection lens system is arranged in the direction of the normal line risen from the center of the screen. On the other hand, red and blue projection lens systems are arranged so that each optical axis intersects the center of the screen in the horizontal direction observing from the screen side, on both sides of the green projection lens system.

The mirror is inserted between the screen and the projection lens in order to balance the height and depth of the whole projection television set. However, with this composition, since the mirror is arranged at an angle to refract the light emitted from the projection lens in the direction to coincide with the optical axis, an extra space is required behind the mirror. This space becomes the dead space and accordingly there is the problem that the set becomes large sized.

In the conventional projection lens system, as disclosed in U.S. Pat. No. 4,682,862, the first lens to the sixth lens are arranged on the optical axis which coincides with the normal line on the vertex of fluorescent plane on the CRT face plate.

As a method to miniaturize the construction of projection television set, the method for making the angle of view of the projection lens wider can be considered. However, with this arrangement, the number of lenses increases and simultaneously, the assembling accuracy becomes worse. Furthermore, the method to decrease the number of lenses using non-spherical surface can be considered. However, with this arrangement, the load on the higher non-spherical surface increases, so that the lens manufacturing becomes difficult.

Firstly, in order to make the dead space behind the mirror as small as possible and downsize the projection television set, the arrangement to tilt the optical axis of the projection lens to the normal line of screen on the basis of the screen center can be considered.

In this case, the relationship between the screen face, the projection lens and the fluorescent plane of the CRT is determined according to Scheimfulg's law in regard to the angle of swings and tilts. However, in this manner, since the magnification differs according to the position of the screen in the vertical direction, the rectangular shape changes to the trapezoid shape, and this results in the occurrence of resolution deviation.

Secondly, the arrangement to move the lens in the vertical direction to the screen normal line by keeping the optical axis of lens parallel to the screen normal line can be considered.

In this case, the magnification relationship between the screen and the fluorescent plane of the CRT is constant. Accordingly, the image shape does not change. However, the load to the angle of view of the lens becomes bigger, and in the case of wide angle of view, picture power correction is required. Also it is necessary to have the lens with large aperture in order to suppress the unevenness of light quantity in the peripheral region to the level of practical usage.

Thirdly, as disclosed in the U.S. Pat. No. 4,682,862, if the projection lens, which is normally arranged such that the optical axis is in the direction of screen normal line, is arranged according to the first and the second methods described above, the effective area on the screen with respect to the angle of view of the projection lens becomes non-symmetrical at the cross section where the optical axis is inclined, and since correction balance of the picture plane changes, it results that not necessarily good picture power can be obtained.

SUMMARY OF THE INVENTION

In view of the foregoing, an object of this invention is to provide a projection lens system which by projecting an image from the skew angle on the screen is, the projection television set can be downsized as a whole, and can have better picture power than the case where the projection lens is arranged in the direction of screen normal line.

The foregoing objects and other objects of the invention have been achieved by the provision of a projection lens system, comprising: a CRT for projecting an image; a screen on which the image from the CRT is projected; and a projection lens system comprising successively from the screen side; the first lens being a meniscus lens which has the convex face on the screen side and has at least one face a non-spherical surface, the second lens being a meniscus lens which has the concave face on the screen side and has at least one face being a non-spherical surface, the third lens having two convex faces, the fourth lens being a negative lens, the fifth lens being a positive lens, and the sixth lens being a meniscus lens which has the sharp concave surface toward the screen side and has the surface on the screen side being a non-spherical surface. Furthermore, the CRT and the projection lens system is arranged to satisfy the following equations.

$$\theta L = 0.6 \cdot \theta S + 2 \quad (1)$$

$$\theta L = 0.4 \cdot \theta S - 2 \quad (2)$$

$$0° < \theta S \leq 30° \quad (3)$$

$$0° \leq \theta L \quad (4)$$

Provided that $\theta S$ is an angle formed with an axis line from the center point on the screen to the exit pupil of the projection lens system and the normal line toward the screen on the center of the screen. $\theta L$ is an angle formed with the normal line toward the screen and the optical axis of the projection lens system at the point where the optical axis of the projection lens system intersects the screen.

On this condition, the CRT is arranged to project the center of the image on the CRT at the center of the screen through the projection lens.

If possible, the composition of this system should satisfy the following equations.

$$0.85 < K_m/K_0 \leq 1.0 \quad (5)$$

$$D \cdot K_0 > 0.75 \quad (6)$$

Provided that $K_O$ represents the power of whole system, $K_M$ represents the power of the third lens having two convex surfaces, D represents the distance between the fifth lens which is a positive lens and the sixth lens which is meniscus lens in the direction of optical axis in the effective area peripheral region.

In the projection lens system, it is desirable that the sixth lens is incorporatively arranged with regard to the CRT via the cooling liquid.

According to this invention, the lens aberration can be efficiently corrected by assuming nonsymmetricity of the angle of view from the beginning by inclining the lens normal line with respect to the screen normal line. Simultaneously the lens shape is made easy to manufacture and excellent picture power can be obtained by introducing non-spherical surface to the appropriate lens surface.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 3A, 3B, 3C, 3D, and 3E to 8A, 8B, 8C, 8D, and 8E are characteristic curvilinear diagrams showing MTF (modulation transfer function) characteristics at spatial frequency 1/mm at each point on the screen when the inclined angle of projection onto the screen by the projection lens system and the angle of deflection of the projection lens system are changed;

FIG. 13 is a table showing numeral values selected as the paraxial curvature radius at the vertex of i-th lens, the space of i-th lens surface, the refractive index of i-th medium at the wave length 545 [nm] and Abbe's number for line "d" of i-th medium with regard to the projection lens shown in FIG. 12;

FIGS. 14A and 14B are tables showing numeral values selected as the spherical data with regard to the projection lens shown in FIG. 12;

FIG. 17 is a table showing numeral values selected as the paraxial curvature radius at the vertex of i-th lens, the space of i-th lens surface, the refractive index of i-th medium at the wave length 545 [nm] and Abbe's number for line "d" of i-th medium with regard to the projection lens shown in FIG. 16;

FIGS. 18A and 18B are tables showing numeral values selected as the non-spherical data with regard to the projection lens of the second embodiment shown in FIG. 16;

FIG. 21 is a table showing numeral values selected as the paraxial curvature radius at the vertex of i-th lens, the space of i-th lens surface, the refractive index of i-th medium at the wave length 545 [nm] and Abbe's number for line "d" of i-th medium with regard to the projection lens shown in FIG. 20;

FIGS. 22A and 22B are tables showing numeral values selected as the non-spherical data with regard to the projection lens shown in FIG. 20;

FIG. 24 is a table showing values of the first condition $K_M/K_O$ and the second condition $D \cdot K_O$, in the first to the third embodiment.

DETAILED DESCRIPTION OF THE EMBODIMENT

Figure 1:
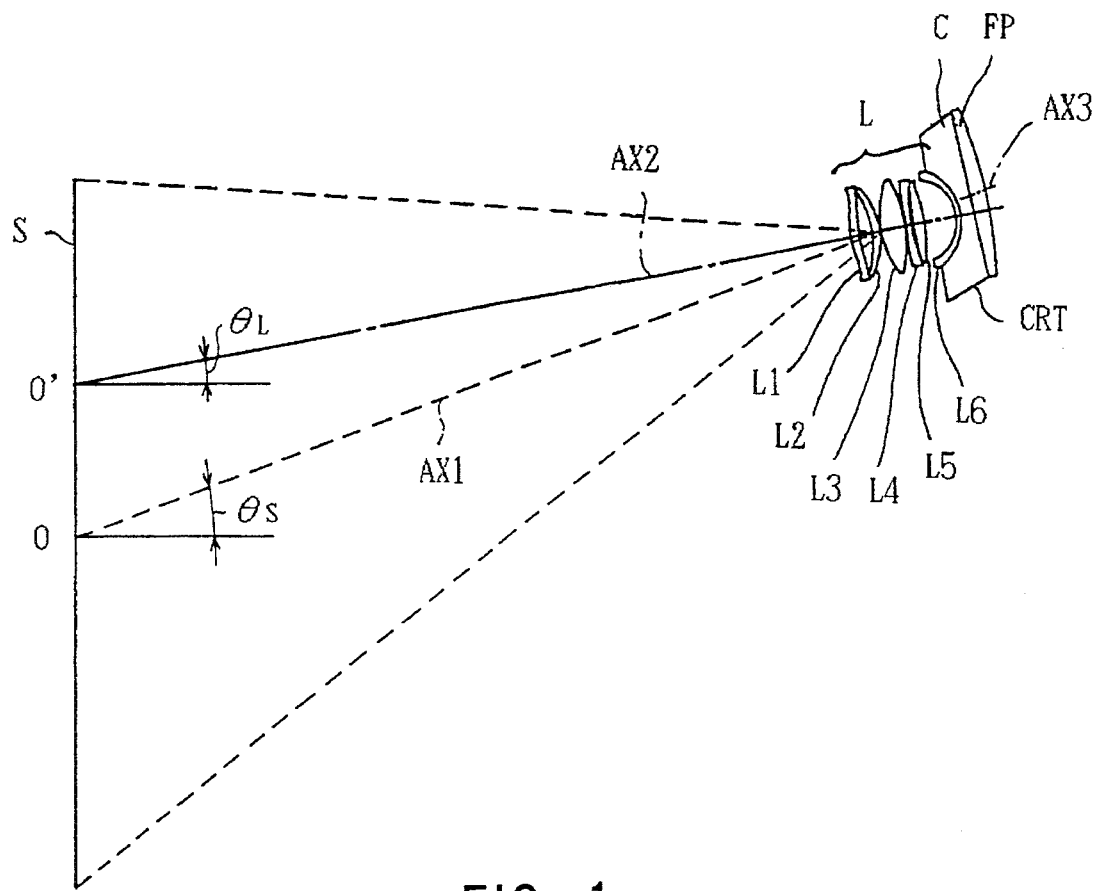
FIG. 1 is a schematic diagram showing a projection lens system arrangement according to this invention.

Preferred embodiments of this invention will be described with reference to the accompanying drawings:

FIG. 1 generally shows the arrangement of projection lens system according to this invention. The light emitted from the face plate FP of the CRT passes through a cooling liquid C and a projection lens L successively, and is obliquely projected on a screen S along the optical axis AX1 of the projection lens L which intersects the screen S at the intersecting point O. An optical axis AX1 is the line from the center point O on the screen S to the exit pupil of the projection lens L. An angle $\theta S$ is formed with the optical axis AX1 and the normal line at the center point O on the screen S. An optical axis AX2 is the optical axis of the projection lens L, which intersects the screen at the point O'. The angle $\theta L$ is formed with the normal line with regard to the screen S at the point O' on the screen S and the optical axis AX2. The projection lens L is obliquely arranged with regard to the optical axis AX1 in order that the optical axis AX2 may reach the screen S at the point O'. Therefore, the normal line AX3 at the vertex of fluorescent plane on the face plate FP of the CRT is shifted from the optical axis AX2 of the projection lens L.

Figure 2:
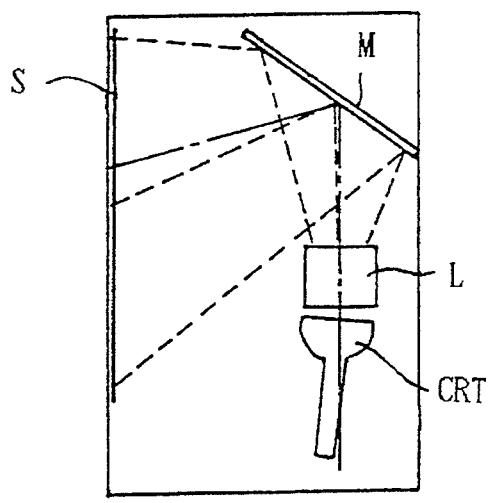
FIG. 2 is a schematic diagram showing the construction of a rear projection television set applied the projection lens system of FIG. 1.
Figure 4A:
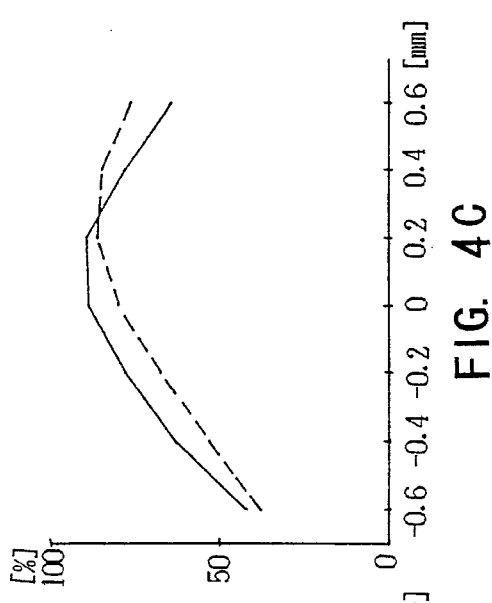
Figure 4B:
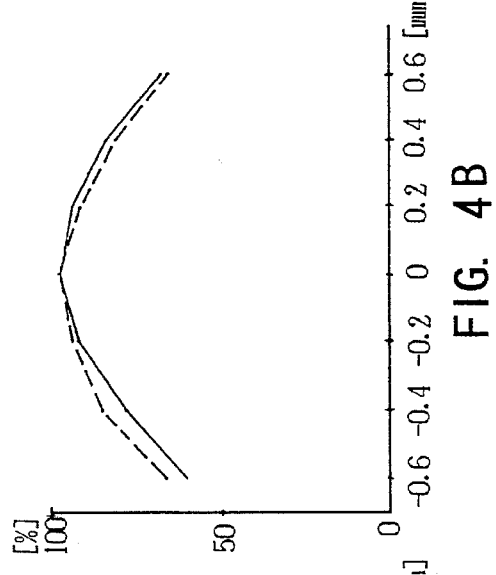
Figure 4C:
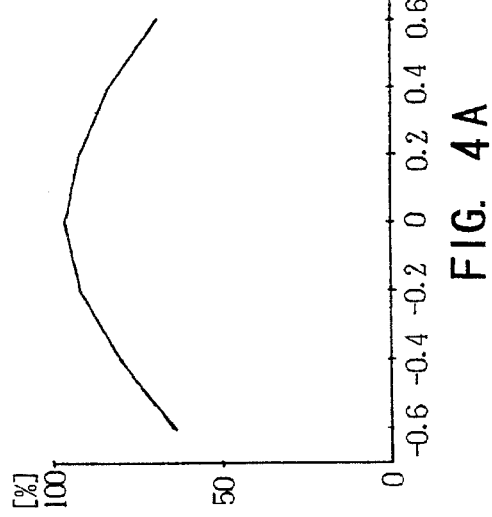
Figure 4D:
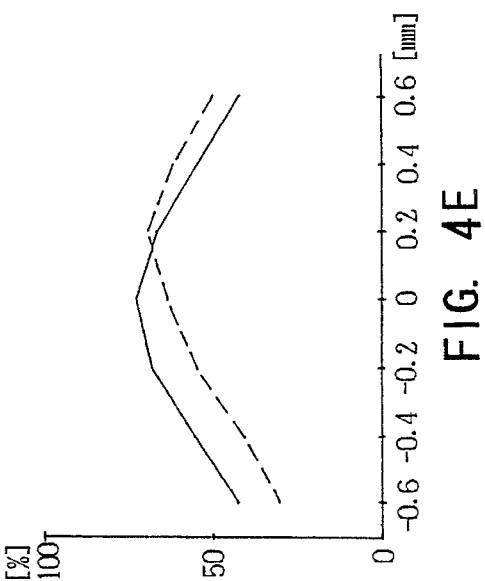
Figure 4E:
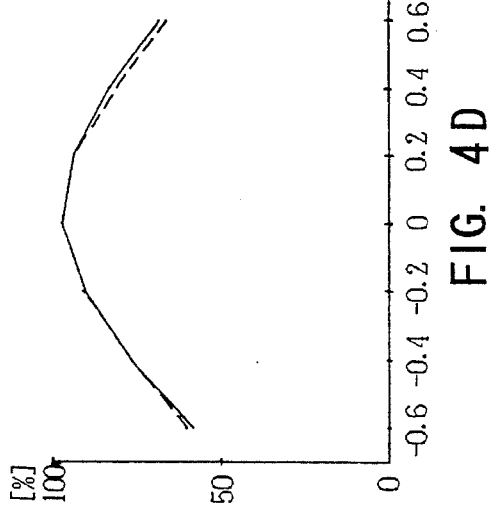
Figure 7A:
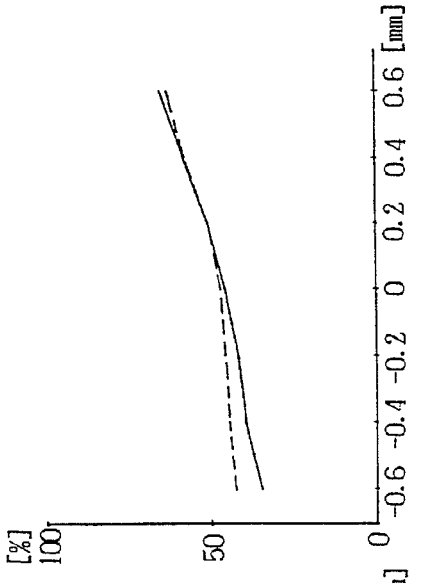
Figure 7B:
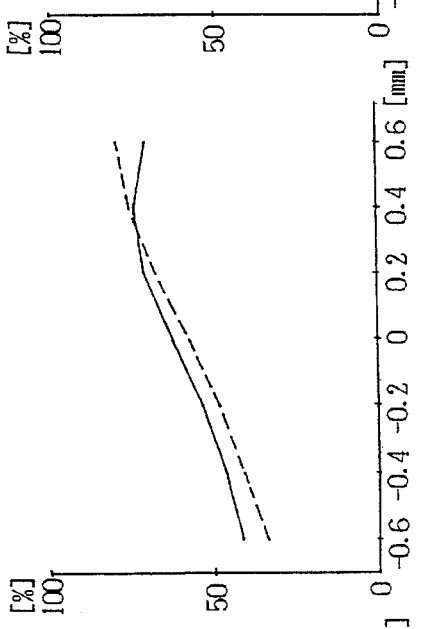
Figure 7C:
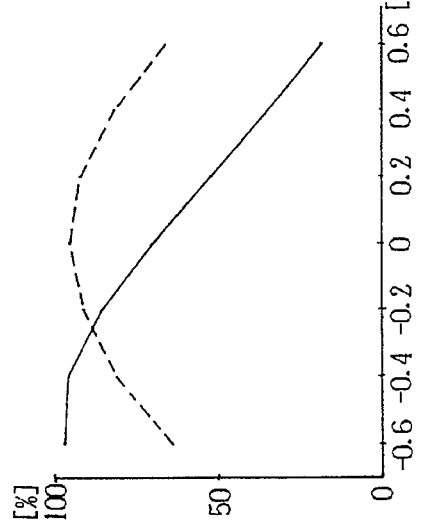
Figure 7D:
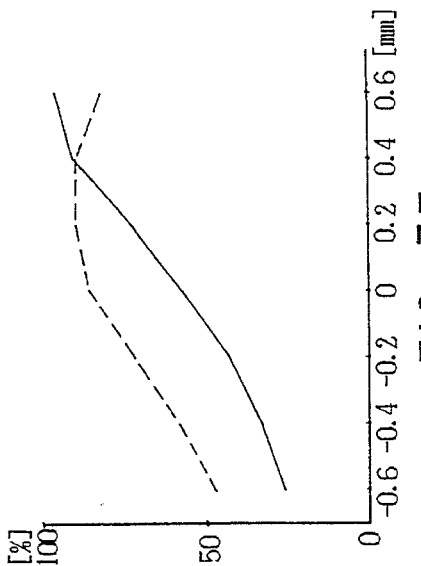
Figure 7E:
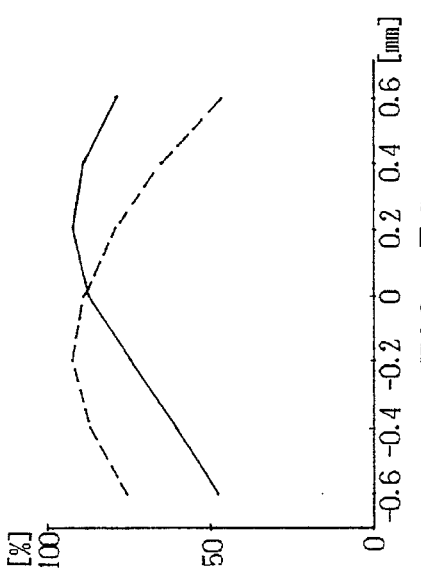
Figure 8A:
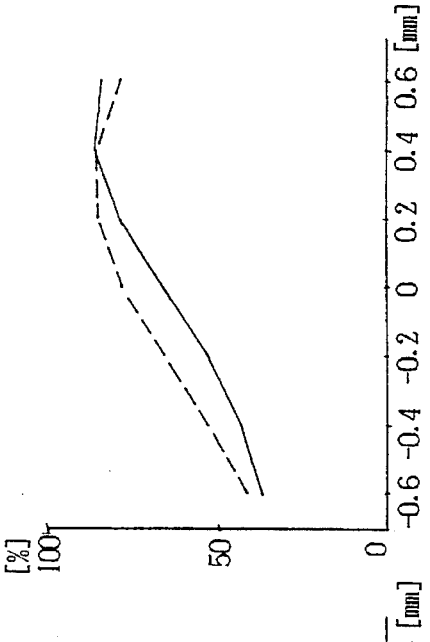
Figure 8B:
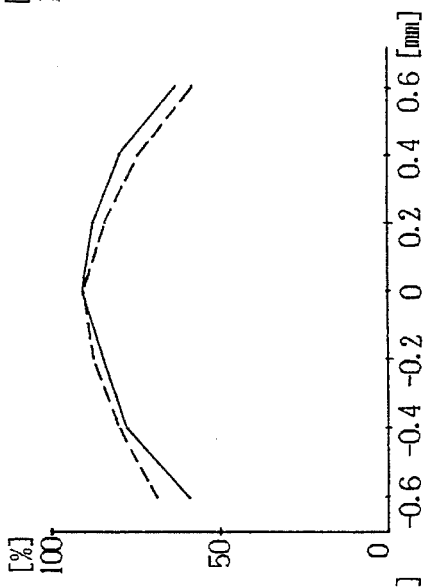
Figure 8C:
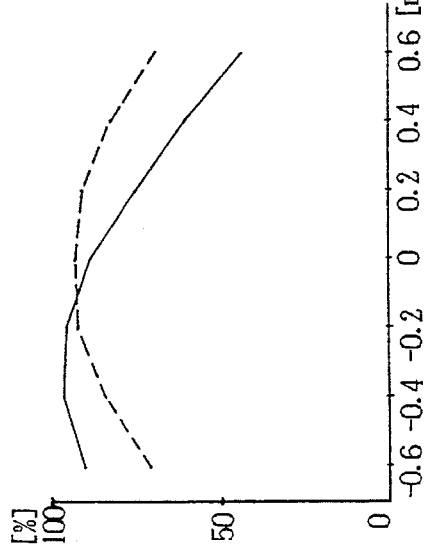
Figure 8D:
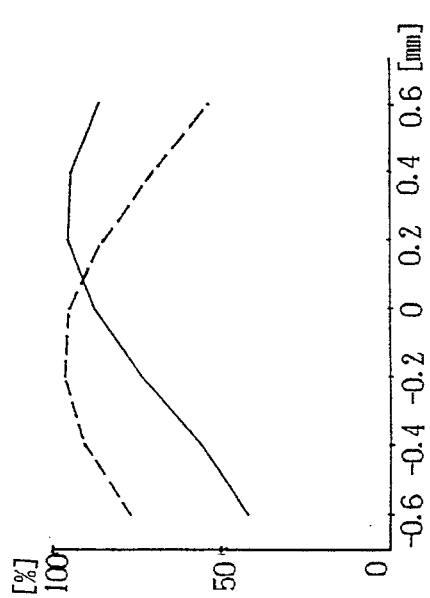
Figure 8E:
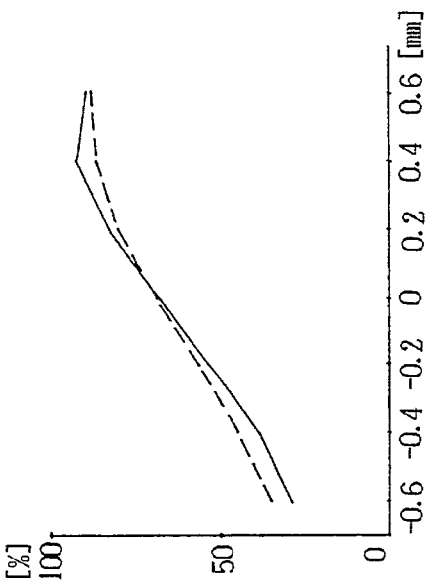

FIG. 2 generally shows the projection lens system applied to a rear projection television. The light emitted from the CRT passes through the projection lens L, and then is refracted by the mirror M to be projected on the screen S.

Figure 9:
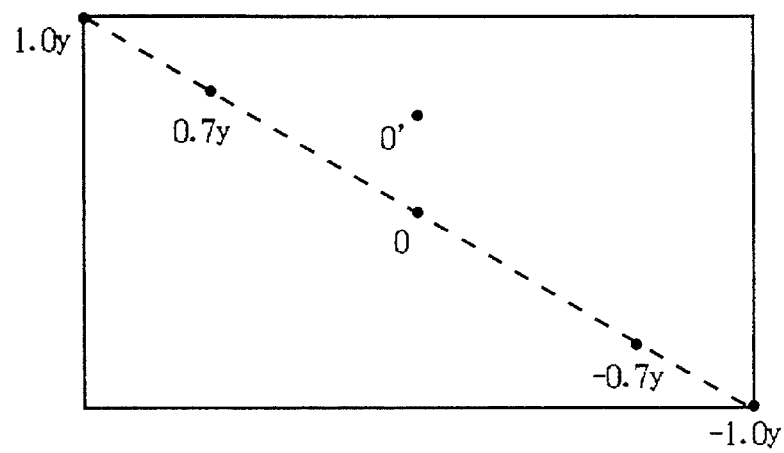
FIG. 9 is a schematic diagram showing the value points on the screen.

FIGS. 3A to 3E, 4A to 4E, 5A to 5E, 6A to 6E, 7A to 7E, and 8A to 8E show the MTF (modulation transfer function) characteristics at the spatial frequency 11 [p/mm] with regard to the defocus quantity at the respective points on the screen when the angle $\theta S$ and the angle $\theta L$ are changed. As shown in FIG. 9, the points on the screen are five points of 0, $-0.7y$, $-1.0y$, $0.7y$, and $1.0y$.

FIGS. 3A to 3E show the MTF characteristics at the respective points on the screen, 0, $-0.7y$, $-1.0y$, $0.7y$, and $1.0y$, in case of $\theta S=5°$ and $\theta L=0°$.

FIGS. 4A to 4E show the MTF characteristics at the respective points on the screen, 0, $-0.7y$, $-1.0y$, $0.7y$, and $1.0y$, in case of $\theta S=5°$ and $\theta L=5°$.

FIGS. 5A to 5E show the MTF characteristics at the respective points on the screen, 0, $-0.7y$, $-1.0y$, $0.7y$, and 1.0y, in case of θS=30° and θL=10°.

FIGS. 6A to 6E show the MTF characteristics at the respective points on the screen, 0, −0.7y, −1.0y, 0.7y, and 1.0y, in case of θS=30° and θL=20°.

FIGS. 7A to 7E show the MTF characteristics at the respective points on the screen, 0, −0.7y, −1.0y, 0.7y, and 1.0y, in case of θS=40° and θL=15°.

FIGS. 8A to 8E show the MTF characteristics at the respective points on the screen, 0, −0.7y, −1.0y, 0.7y, and 1.0y, in case of θS=40° and θL=25°.

In FIGS. 3A to 3E, 4A to 4E, 5A to 5E, 6A to 6E, 7A to 7E, and 8A to 8E, the solid lines represent the MTF characteristics in the perpendicular direction with regard to the direction of the diagonal line of the screen; the broken lines represent the MTF characteristics in the parallel direction with regard to the direction of the diagonal line of the screen.

Figure 10:
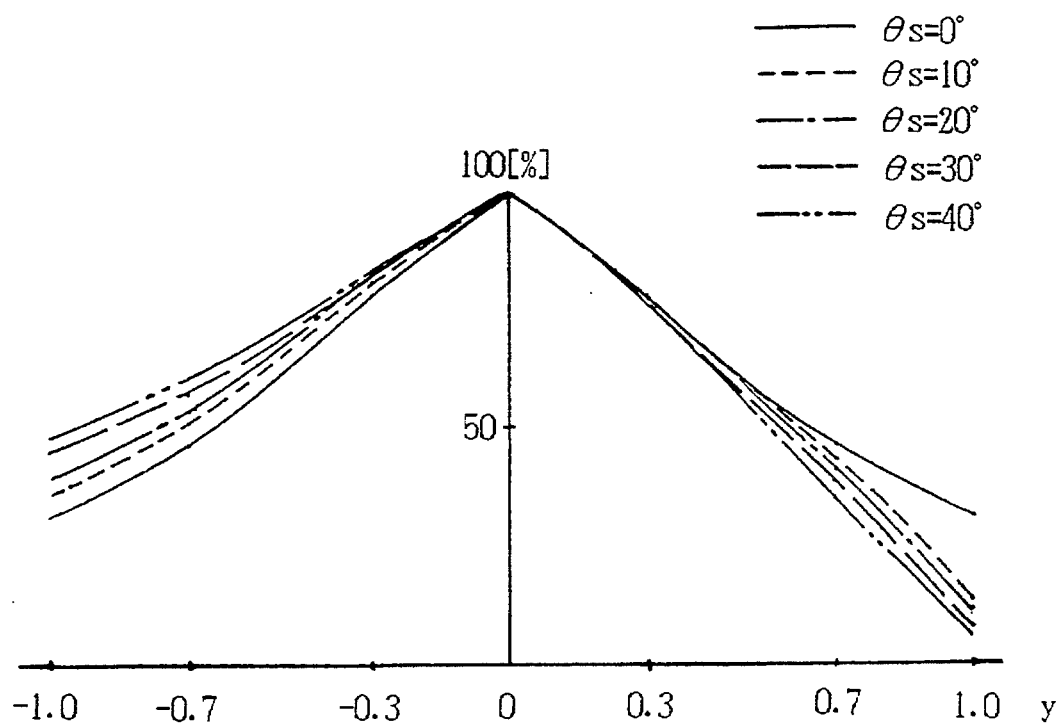
FIG. 10 is a characteristic curvilinear diagram showing the ratio of the peripheral light quantity of each angle of projection with regard to the each value point on the screen.
Figure 11:
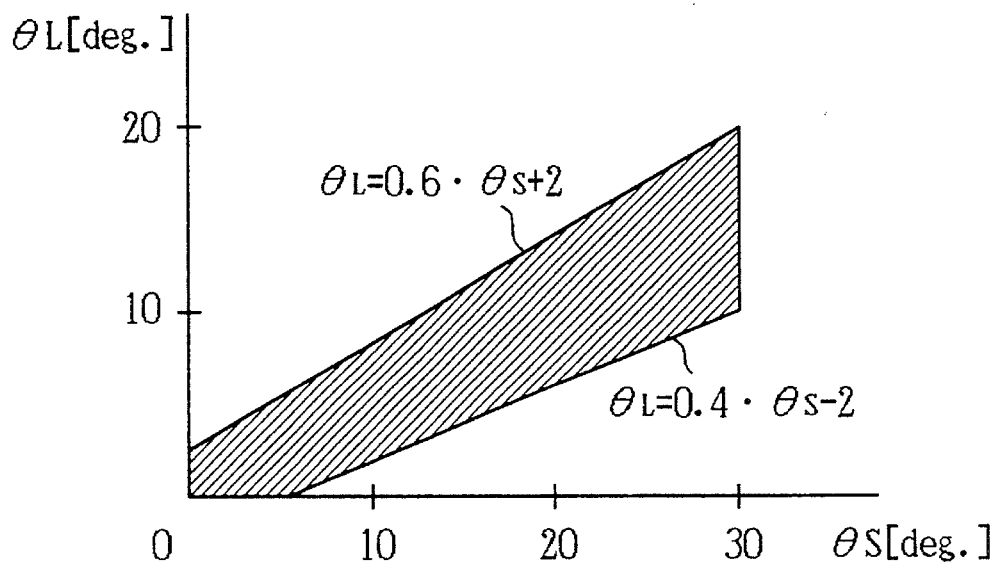
FIG. 11 is a characteristic diagram showing the range of combination of the inclined angle of projection onto the screen by the projection lens system and the angle of deflection of the projection lens system.

FIG. 11 shows the MTF characteristics shown in FIGS. 3A to 3E, 4A to 4E, 5A to 5E, 6A to 6E, 7A to 7E, and 8A to 8E, and the range of pertinent combination θS with θL based on the characteristic curvilinear diagram showing the ratio of the peripheral light quantity of θS with regard to each point on the screen S shown in FIG. 10. In this range, the degradation of picture quality due to the shift of focus in the perpendicular direction and in the parallel direction with regard to the diagonal line of the screen is not a problem. Based on FIGS. 3A to 3E, 4A to 4E, 5A to 5E, 6A to 6E, 7A to 7E, and 8A to 8E, the region where the MTF peak values at the respective value points in the perpendicular and the parallel direction with regard to the diagonal line of the screen are within ±0.4 [mm] is selected as the borderline of this range. Also, the borderline of this range is selected in consideration of the balance of the symmetry of right and left to the focus point shown in FIG. 10.

As a result, the following equations are obtained:

$$\theta L = 0.6 \cdot \theta S + 2 \quad (7)$$

$$\theta L = 0.4 \cdot \theta S - 2 \quad (8)$$

$$0° < \theta S \leq 30° \quad (9)$$

$$0° \leq \theta L \quad (10)$$

As shown in FIG. 1, the projection lens L comprises the first lens L1 composed of a meniscus lens with the convex facing towards the screen side and at least one face surface is a non-spherical surface, the second lens L2 composed of a meniscus lens with the concave face facing towards the screen side and at least one face is a non-spherical surface, the third lens L3 composed of a two convex face lens, the fourth lens L4 composed of a negative lens, and the fifth lens L5 composed of a positive lens, and the sixth lens L6 composed of a meniscus lens facing the sharp concave face facing towards the screen side and the screen side surface is a non-spherical surface, successively from the screen side.

Figure 12:
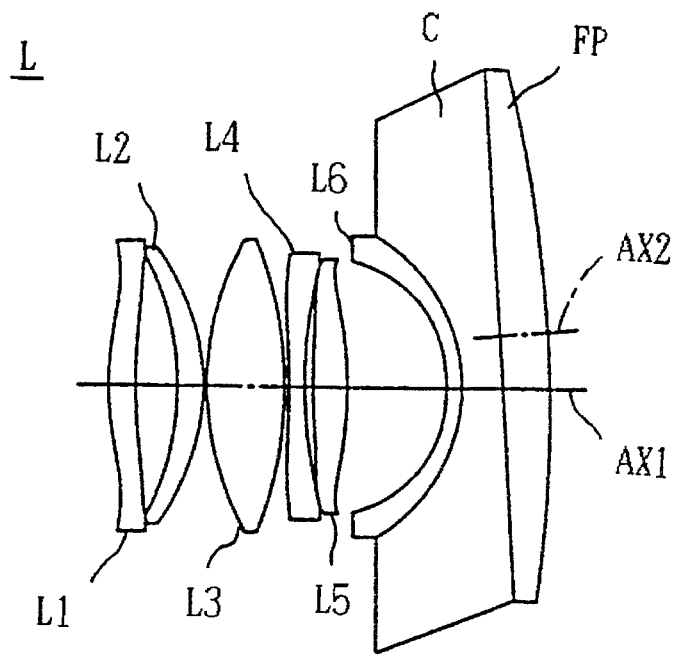
FIG. 12 is a cross section showing the projection lens of the first embodiment.
Figure 15:
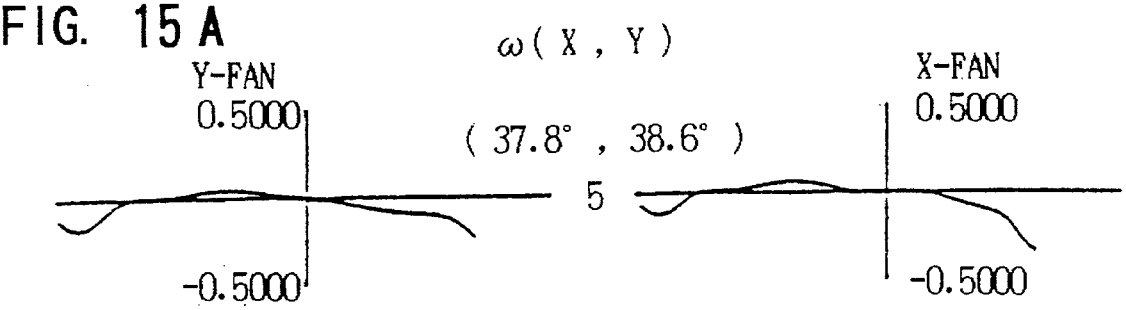
FIGS. 15A to 15E are characteristic curvilinear diagrams showing the lateral aberration of the first embodiment.
Figure 15:
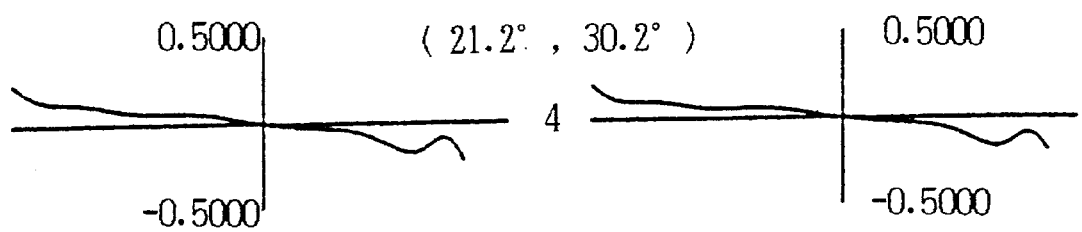
Figure 15:
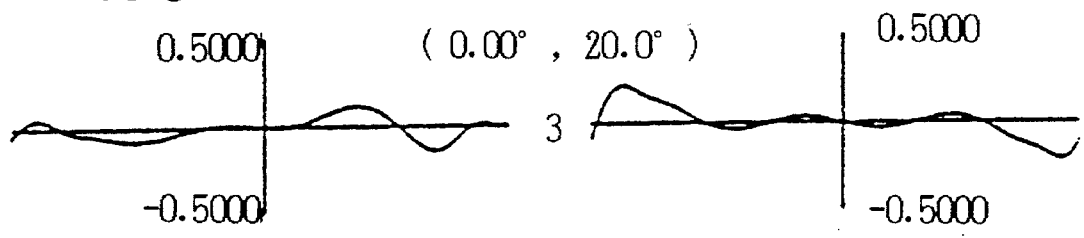
Figure 15:
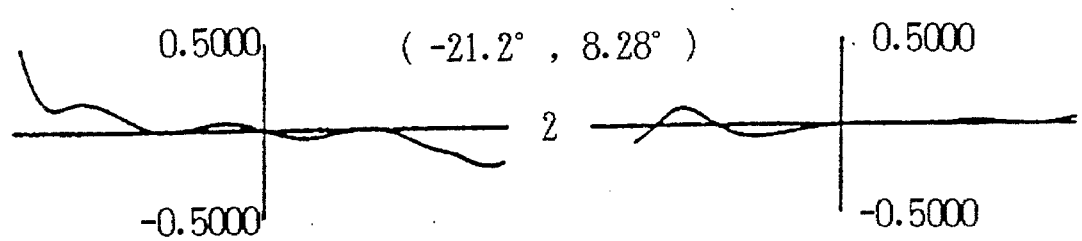
Figure 15:
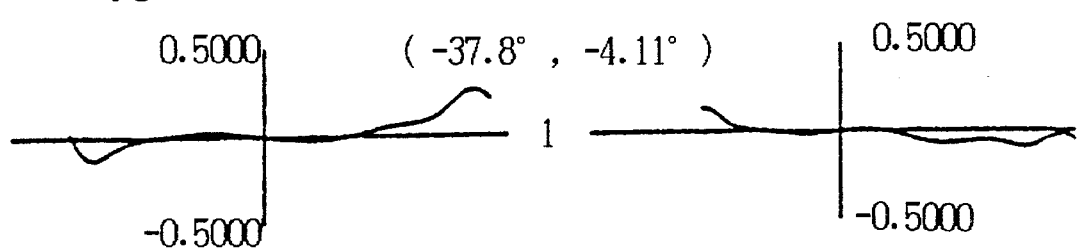
Figure 16:
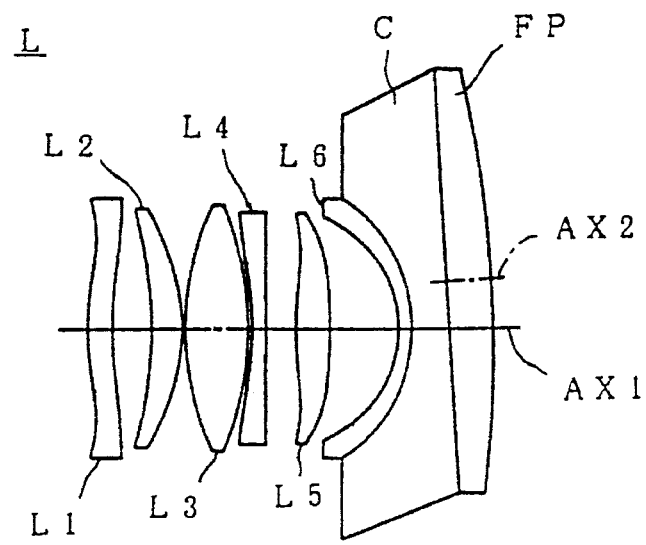
FIG. 16 is a cross section showing the projection lens of the second embodiment.
Figure 20:
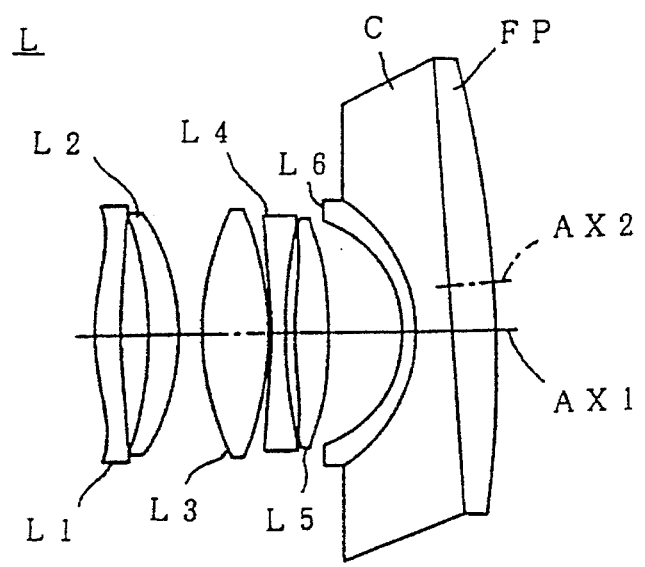
FIG. 20 is a cross section showing the projection lens of the third embodiment.
Figure 19A:
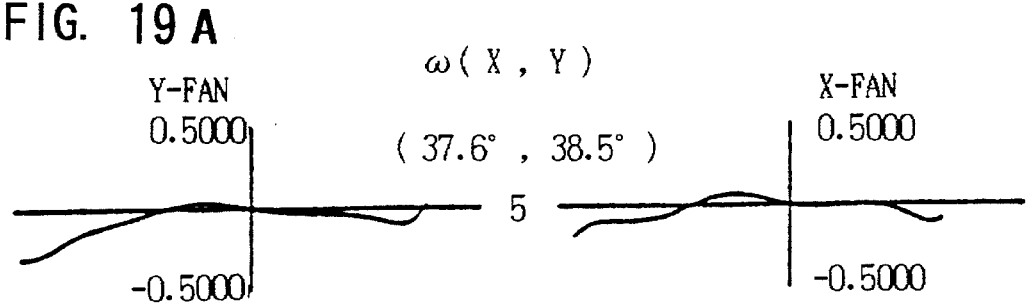
FIGS. 19A to 19E are characteristic curvilinear diagrams showing the lateral aberration of the second embodiment.
Figure 19B:
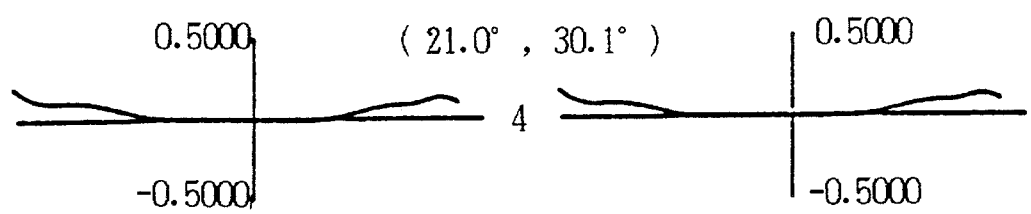
Figure 19C:
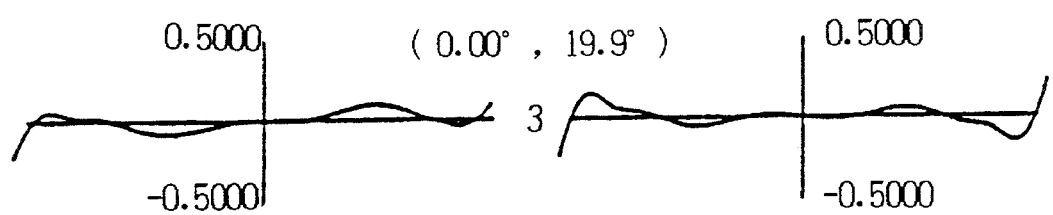
Figure 19D:
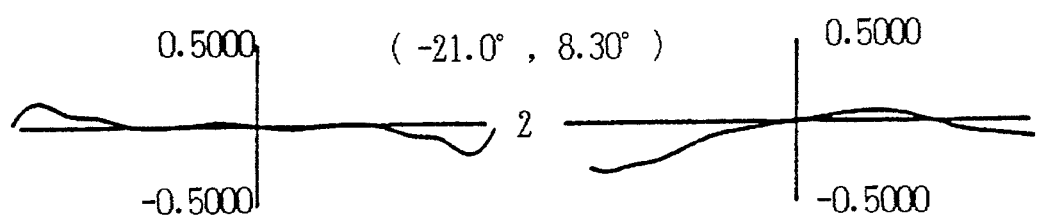
Figure 19E:
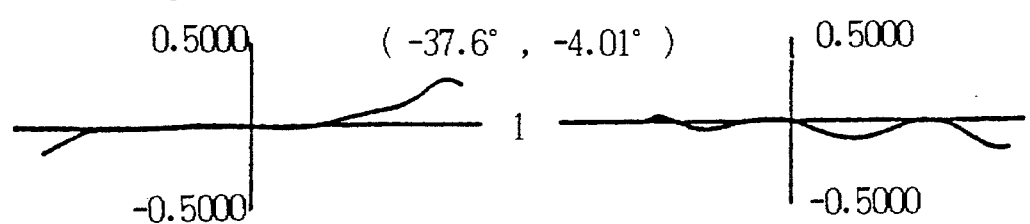
Figure 23:
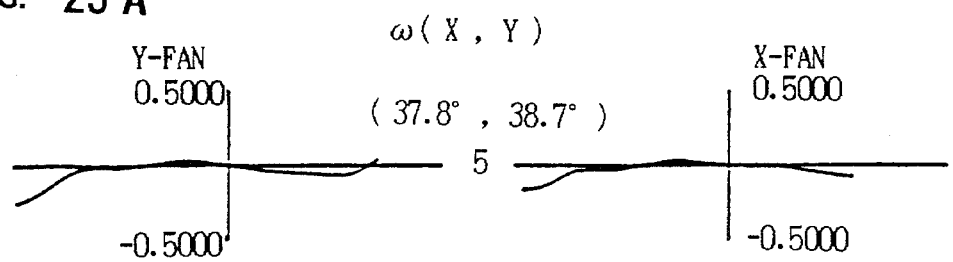
FIGS. 23A to 23E are characteristic curvilinear diagrams showing the lateral aberration of the third embodiment.
Figure 23:
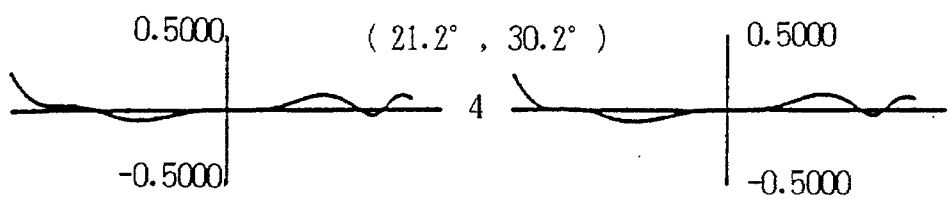
Figure 23:
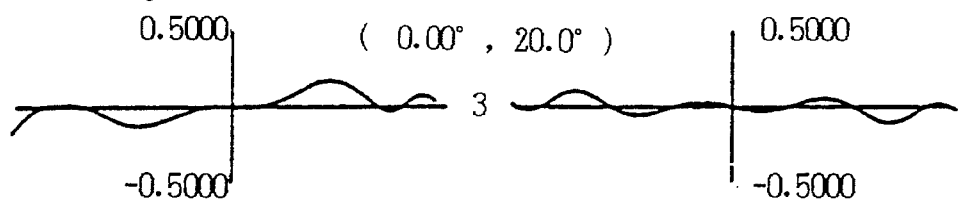
Figure 23:
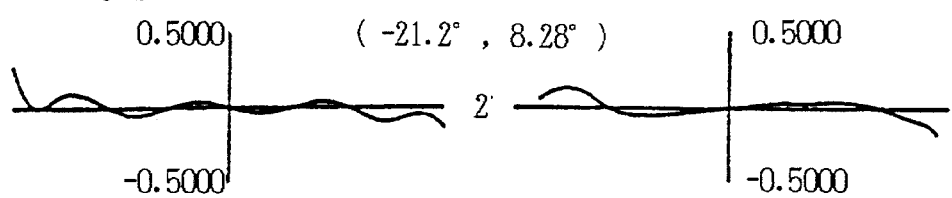
Figure 23:
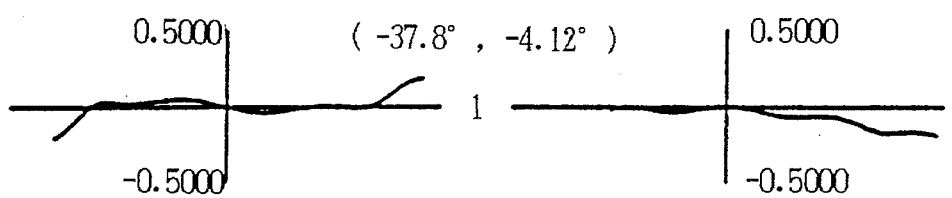

FIGS. 12, 16 and 20 show numerical embodiments of the projection lens L and the projection lens L of FIGS. 12, 16 and 20 which have lateral aberration powers as shown in FIGS. 15A to 15E, 19A to 19E and 23A to 23E, respectively.

The projection lens L of the first, second and third embodiments is defined by the paraxial curvature radius $r_i$ at the vertex of i-th lens in order from the screen side, the space $d_i$ of i-th lens surface in order from the screen side, the refractive index $n_i$ at the wave length 545 [nm] of i-th medium in order from the screen side, and the Abbe's number $v_i$ for "d" line of i-th medium in order from the screen side.

More specifically, in the non-spherical shape in a rectangular coordinate system with the optical axis direction as "Z" coordinate axis, when the paraxial curvature radius of lens vertex is "r", the conical constant is "K", and non-spherical coefficients are $A_4$, $A_6$, $A_8$, ... $A_{18}$, and $A_{20}$, the height in the direction of "Z" coordinate axis can be obtained by the following equation:

$$Z = \frac{H^2/r}{1 + \sqrt{1 - (K+1)(H/r)^2}} + A_4 H^4 + A_6 H^6 + \ldots + A_{20} H^{20} \quad (11)$$

In above equation, "H" is expressed by the following equation:

$$H = \sqrt{X^2 + Y^2} \quad (12)$$

(1) The First Embodiment

In regards to the projection lens L of FIG. 12, where the paraxial curvature radius at the vertex of i-th lens is $r_i$, the space of i-th lens surface is $d_i$, the refractive index of i-th medium at the wave length 545 [nm] is $n_i$, and Abbe's number for "d" line of i-th medium is $v_i$, the numerical values are selected as shown in FIG. 13. At this point, the spherical data is selected as the values shown in FIGS. 14A and 14B.

According to the foregoing construction, the first lens L1 corrects the axial aberration and plays a role of making F value to such a large aperture ratio as "1.0". The second lens L2 corrects the flare component effectively by the higher non-spherical term. Also, it is combined power of the first lens L1 and the second lens L2 to decrease the power load of the third lens L3 and balance the image plane correction.

Since the third lens L3 supplies almost of the powers of the whole system, it is made stable for temperature changes by using a glass lens.

The fourth lens L4 is the negative lens and chromatic aberration is corrected by using high dispersive material. In the case of this embodiment, polycarbonate material is used, but since this has double refractivity, special care has been taken in order not to place too much load on this.

The fifth lens L5 is the positive lens. However, it holds the combined power with the fourth lens L4 weakly and performs image correction effectively in the peripheral region of the image plane by the non-spherical component.

Since the sixth lens L6 has very strong negative power by filling with the cooling liquid C between the face plate FP of the CRT and the sixth lens L6, thus the curvature of the image plane can be corrected and the flare component in the peripheral area of the image plane can be corrected by the non-spherical surface.

According to the foregoing construction, the diagrams showing the lateral aberration of the projection lens system according to FIG. 12, as shown in FIGS. 15A to 15E, demonstrate that, practically sufficient image power can be obtained.

(2) The Second Embodiment

Regarding the projection lens L of the second embodiment shown in FIG. 16, the numerical values as shown in FIG. 17 are selected, and simultaneously, non-spherical data as shown in FIGS. 18A and 18B are selected.

Thus, according to the construction shown in FIG. 16, the projection lens system having the lateral aberration as shown in FIGS. 19A to 19E can be obtained, and thus, practically sufficient image power can be obtained.

(3) The Third Embodiment

For the projection lens L of FIG. 20 the numerical values as shown in FIG 21 are selected, and simultaneously, non-spherical data as shown in FIG. 22A and 22B are selected.

As a result, practically sufficient image powers can be obtained for the projection lens system of FIG. 20, as shown in diagrams showing the lateral aberration of the system of FIG. 20, FIGS. 23A to 23E.

(4) Conditions of the First to the Third Embodiments

In the first to the third embodiments, where $K_O$ is the power of the whole system, $K_M$ is the power of the third lens L3 composed of two convex faces and D is the space between the fifth lens L5 composed of a positive lens and the sixth lens L6 composed of a meniscus lens in the direction of optical axis in the effective area peripheral region, values of the first condition $K_M/K_O$ and the second condition $D \cdot K_O$ are shown in FIG. 24, stet a result, it is apparent that the range of the first condition and the second condition in the first to the third embodiments is desirable to be $0.85 < K_M/K_O < 1.0$, and $0.075 < D \cdot K_O$.

This first condition relates to the third lens L3 and if it is exceeds the upper limit Petzval's sum increases and the spherical aberration and the sugittal image surface become ill balanced. Also flare occurs on the image plane peripheral region so that it becomes difficult to widen the angle of view.

On the other hand, if the lowest limit is exceeded, the power load for the whole lens system leans toward the first lens and second lens side and it becomes impossible to control the image changes for the temperature.

Furthermore, the second condition described above relates to the allowed amount of focussing and shows the minimum value to adjust changes of the focal point of the temperature and errors at the time of manufacturing.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A projection lens system comprising a cathode ray tube for projecting images;

a screen to receive said images projected from said cathode ray tube;

a series of lenses including, successively from said screen side:

a first meniscus lens having a convex face on said screen side and at least one face being composed of a non-spherical surface;

a second meniscus lens having a concave face on said screen side and at least one face being composed of a non-spherical surface;

a lens having two convex faces;

a negative lens;

a positive lens; and a third meniscus lens having a concave face toward said screen side and said concave face of said third meniscus lens being composed of a non-spherical surface, wherein said cathode ray tube and said projection lens system are arranged to satisfy the following equations:

$\theta L = 0.6 \cdot \theta S + 2$ $\theta L - 0.4 \cdot \theta S - 2$ $0° < \theta S \leq 30°$ $0° \leq \theta L$ where $\theta S$ is an angle formed with an axis line from the center point of said screen to the exit pupil of said projection lens system and a line normal to the center of said screen and $\theta L$ is an angle formed with a line normal to said screen and the optical axis of said projection lens system at the point where the optical axis of said projection lens system intersects said screen; and said cathode ray tube is arranged to project the center of said images onto the center of said screen through said projection lens system.

2. The projection lens system according to claim 1, wherein the following equations are satisfied:

$0.85 < K_M/K_O < 1.0$ $D \cdot K_O > 0.075$ where $K_O$ is the power of the whole system, $K_M$ is the power of said lens having two convex faces, D is the space between said positive lens and said third meniscus lens in the direction of the optical axis of the effective area peripheral region.

3. The projection lens system according to claim 1, wherein said third meniscus lens is coupled to said cathode ray tube via cooling liquid.

* * * * *